United States Patent
Yoshida et al.

(10) Patent No.: US 8,444,441 B2
(45) Date of Patent: May 21, 2013

(54) CARD CONNECTOR

(75) Inventors: Satoru Yoshida, Tokyo (JP); Kouji Kikuchi, Tokyo (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/254,703

(22) PCT Filed: Jan. 15, 2010

(86) PCT No.: PCT/JP2010/000188
§ 371 (c)(1),
(2), (4) Date: Sep. 2, 2011

(87) PCT Pub. No.: WO2010/100815
PCT Pub. Date: Sep. 10, 2010

(65) Prior Publication Data
US 2011/0318967 A1    Dec. 29, 2011

(30) Foreign Application Priority Data
Mar. 5, 2009    (JP) .................................. 2009-052210

(51) Int. Cl.
H01R 12/00    (2006.01)

(52) U.S. Cl.
USPC ....................................................... 439/629

(58) Field of Classification Search
USPC .................................. 439/326–329, 630, 629
See application file for complete search history.

(56) References Cited

U.S. PATENT DOCUMENTS

| | | | |
|---|---|---|---|
| 5,603,629 A * | 2/1997 | DeFrasne et al. ............. | 439/331 |
| 6,053,776 A * | 4/2000 | Bricaud et al. ................ | 439/630 |
| 6,099,335 A * | 8/2000 | Chang ........................... | 439/188 |
| 6,174,188 B1 * | 1/2001 | Martucci ....................... | 439/326 |
| 6,672,886 B2 * | 1/2004 | Billman ......................... | 439/82 |
| 6,685,512 B2 * | 2/2004 | Ooya ............................. | 439/630 |
| 6,997,751 B2 * | 2/2006 | Miyamoto ..................... | 439/630 |
| 7,063,552 B2 * | 6/2006 | Matsunaga et al. ........... | 439/326 |
| 7,063,571 B2 * | 6/2006 | Yu ................................. | 439/630 |
| 7,232,326 B2 * | 6/2007 | Uchida et al. ................. | 439/326 |
| 7,422,462 B2 * | 9/2008 | Wang ............................ | 439/326 |
| 2008/0182441 A1 * | 7/2008 | Kiryu et al. ................... | 439/159 |

FOREIGN PATENT DOCUMENTS

| | | |
|---|---|---|
| JP | A-2002-100440 | 4/2002 |
| JP | A-2003-264016 | 9/2003 |
| JP | A-2006-252823 | 9/2006 |

OTHER PUBLICATIONS

International Search Report in International Application No. PCT/JP2010/000188; dated Feb. 9, 2010 (with English-language translation).

* cited by examiner

Primary Examiner — Briggitte R Hammond
(74) Attorney, Agent, or Firm — Oliff & Berridge, PLC

(57) ABSTRACT

The card connector, into which an IC card having a plurality of pads arranged in parallel at front and back positions is inserted, includes a plurality of contacts each contacting a corresponding one of the plurality of pads of the IC card and a base member that supports the plurality of contacts. Each of the plurality of contacts has a first and a second elastic piece each having a contact point portion that electrically contacts a pad of the IC card. The first and second elastic pieces are formed such that contact pressures of the respective contact point portions against the pads are different from each other. The plurality of contacts is arranged on the base member in parallel at front and back positions and a first and a second contact piece are arranged in an opposite manner in contacts aligned linearly at front and back positions.

5 Claims, 3 Drawing Sheets

CARD CONNECTOR

TECHNICAL FIELD

The present invention relates to a card connector, more particularly to a card connector into which a SIM (Subscriber Identify Module) card is inserted.

BACKGROUND ART

Conventionally, in an electronic device such as a mobile phone, various integrated circuit containing cards (hereinafter also referred to as "IC card") such as a SIM card for expanding functions are used. Such an IC card is usually mounted on an electronic device via a card connector. The card connector for an IC card is provided with a plurality of contacts for electrically connecting the IC card with an electronic device. Each of the contacts has an elongated plate shape and is supported by a so-called cantilever structure in which one end of the contact is fixed to the connector and the other end is a free end. The contacts are arranged in parallel with each other. The IC card is usually inserted in an arrangement direction of the contacts arranged in parallel.

In this type of card connector, when a vibration or a shock is applied to the card connector, a state may occur in which electrical connection between a pad that is an external contact point of the IC card and the contact of the card connector is instantaneously interrupted (hereinafter such a state is referred to as "instantaneous interruption"). When an instantaneous interruption occurs, data communication between the electronic device and the IC card is interrupted, and thus there is a risk that data in communication is lost. As a countermeasure against the instantaneous interruption, for example, a two-point contact type contact is known in which a spring piece of a contact of a card connector is divided into two spring pieces as shown in PTL 1. In the two-point contact type contact, by changing natural frequencies of the two divided spring pieces, the two spring pieces are prevented from detaching from the pad at the same time and causing interruption in the electrical connection.

Incidentally, in the two-point contact type contact, to differentiate natural frequencies of the two divided spring pieces, each spring piece is formed by changing the shape or the size (specifically, length, width, weight, or the like) of the spring piece. Therefore, the contact pressure of one spring piece against the pad of the IC card is inevitably greater than that of the other spring piece.

CITATION LIST

Patent Literature
  PTL 1: Japanese Patent Laid-Open No. 2006-252823

SUMMARY OF INVENTION

Technical Problem

In an IC card such as a SIM card, a plurality of pads as external contact points is arranged in a matrix form in parallel with a front-back direction with respect to a card insertion direction to a card connector. Also in the card connector into which the IC card is inserted and loaded, the two-point contact type contact as shown in PTL 1 can be employed. In this case, in the card connector, for example, a plurality of contacts is arranged in two parallel rows at front and back positions corresponding to the pads of the IC card that are arranged in two rows in the front-back direction. The IC card is inserted into the card connector in the arrangement direction of the contacts arranged in parallel (that is, the front-back direction).

Conventionally, the arrangement of spring pieces of the two-point contact type contacts arranged at front and back positions on the card connector is the same. Specifically, the two-point contact type contacts having a cantilever structure are fixed to and supported by the card connector so that positioning of the two divided spring pieces, that is, a spring piece having large contact pressure and a spring piece having small contact pressure is the same for all the contacts. If the contacts are arranged in this way, when the IC card is inserted into the card connector, each of pads arranged in a front row of the IC card contacts at least two contacts, that is, a contact arranged in a back row and a contact arranged in a front row. Therefore, in a pad arranged in the front row of the IC card, there are a portion that contacts twice a spring piece having large contact pressure of two spring pieces of a two-point contact type contact and a portion that contacts twice a spring piece having small contact pressure of the two-point contact type contact. This varies abrasion condition in a pad of the IC card, and in particular, damage due to abrasion is large in a portion that contacts twice the spring piece having large contact pressure. Therefore, there is a risk that the life of the IC card is shorter than that of a normal IC card.

In view of the above problem, an object of the present invention is to provide a card connector capable of preventing instantaneous interruption between a pad of an IC card and a contact of the card connector as well as attaining equalization of abrasion of the pad of the IC card by devising an arrangement of a two-point contact type contact and capable of increasing the life of the IC card.

Solution to Problem

To achieve the above object, a card connector of the present invention is a card connector into which an IC card having a plurality of external contact points arranged in parallel at front and back positions is inserted, the card connector comprising at least a plurality of contacts each contacting a corresponding one of the plurality of external contact points of the IC card, a base member that supports the plurality of contacts, and a cover member that forms a card accommodation space into which the IC card is inserted when being overlapped on the base member, wherein the IC card is inserted into the card accommodation space through a card insertion opening through which the card accommodation space opens, each of the plurality of contacts has a first and a second elastic piece each having a contact point portion that electrically contacts an external contact point of the IC card, the first and second elastic pieces are formed such that contact pressures of the respective contact point portions against the external contact points are different from each other, and the plurality of contacts is arranged on the base member in parallel at front and back positions in a card insertion direction and a first and a second contact piece are arranged in an opposite manner in contacts aligned linearly at front and back positions in the card insertion direction.

In the present invention, the first and second elastic pieces of the contact may be formed to have the same length and different widths, or may be formed to have different lengths and the same width.

Advantageous Effects of Invention

In the present invention, the first and second elastic pieces each having contact pressure different from each other, in a plurality of contacts arranged in the back row on the base member are respectively arranged to linearly align with the second and first elastic pieces in a plurality of contacts arranged in the front row on the base member. Thereby, it is possible to prevent instantaneous interruption between a pad of the IC card and a contact of the card connector as well as preventing variation in degree of abrasion on a plurality of pads of the IC card which are formed in parallel in the front and back rows.

DESCRIPTION OF EMBODIMENTS

Figure 1:
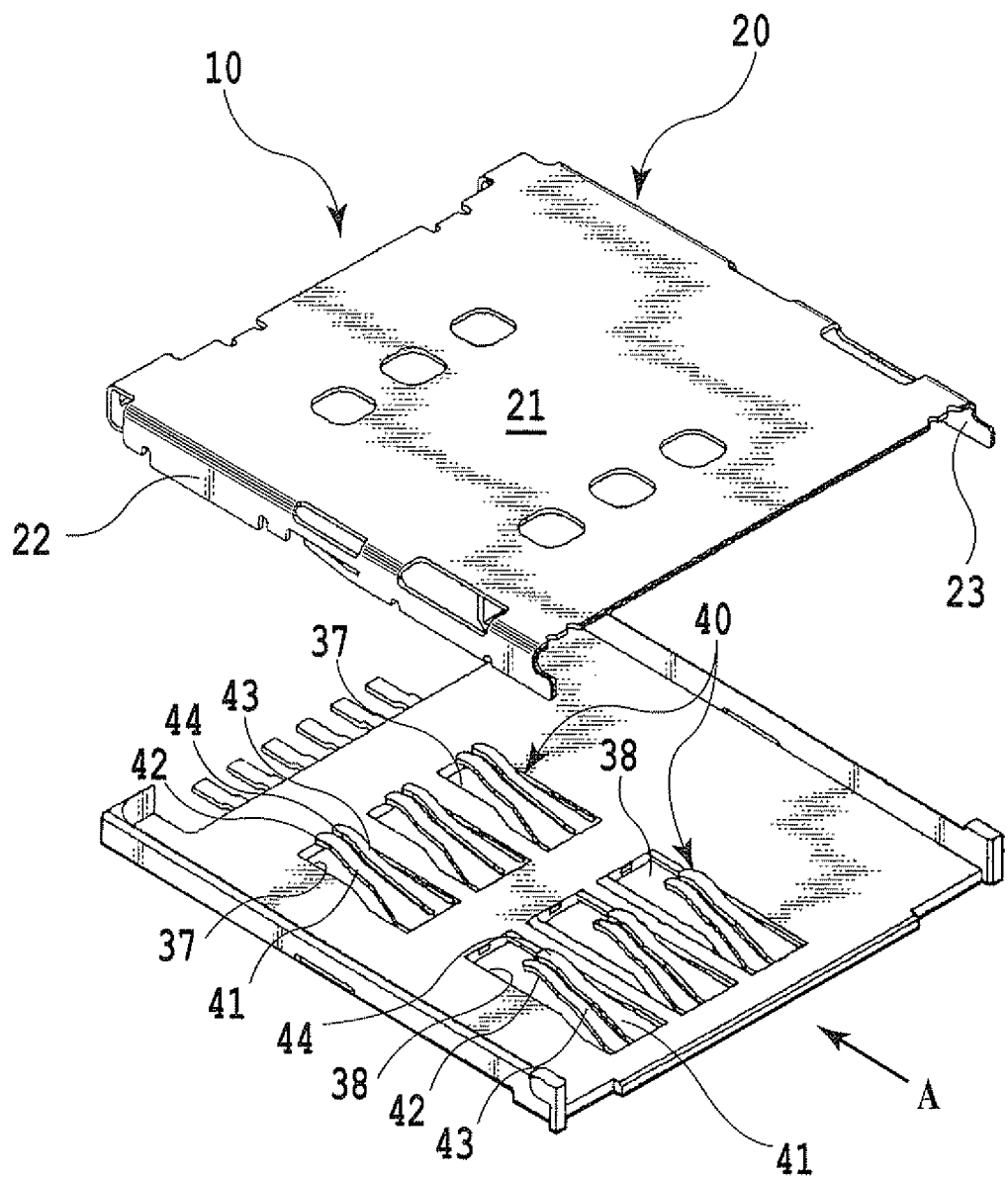
FIG. 1 is a schematic perspective view of a card connector according to an embodiment of the present invention.
Figure 2:
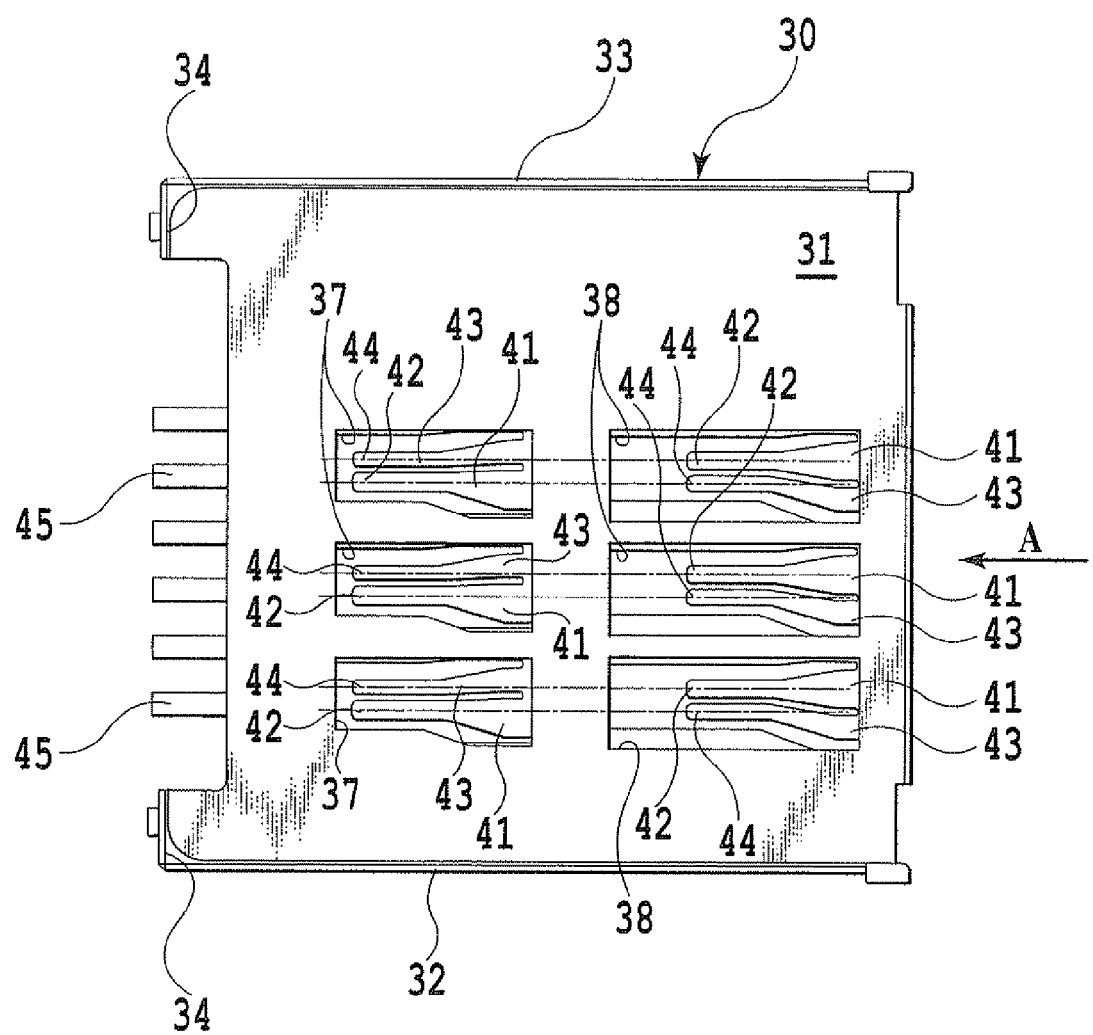
FIG. 2 is a plan view of the card connector of FIG. 1 from which a cover member is removed.
Figure 3:
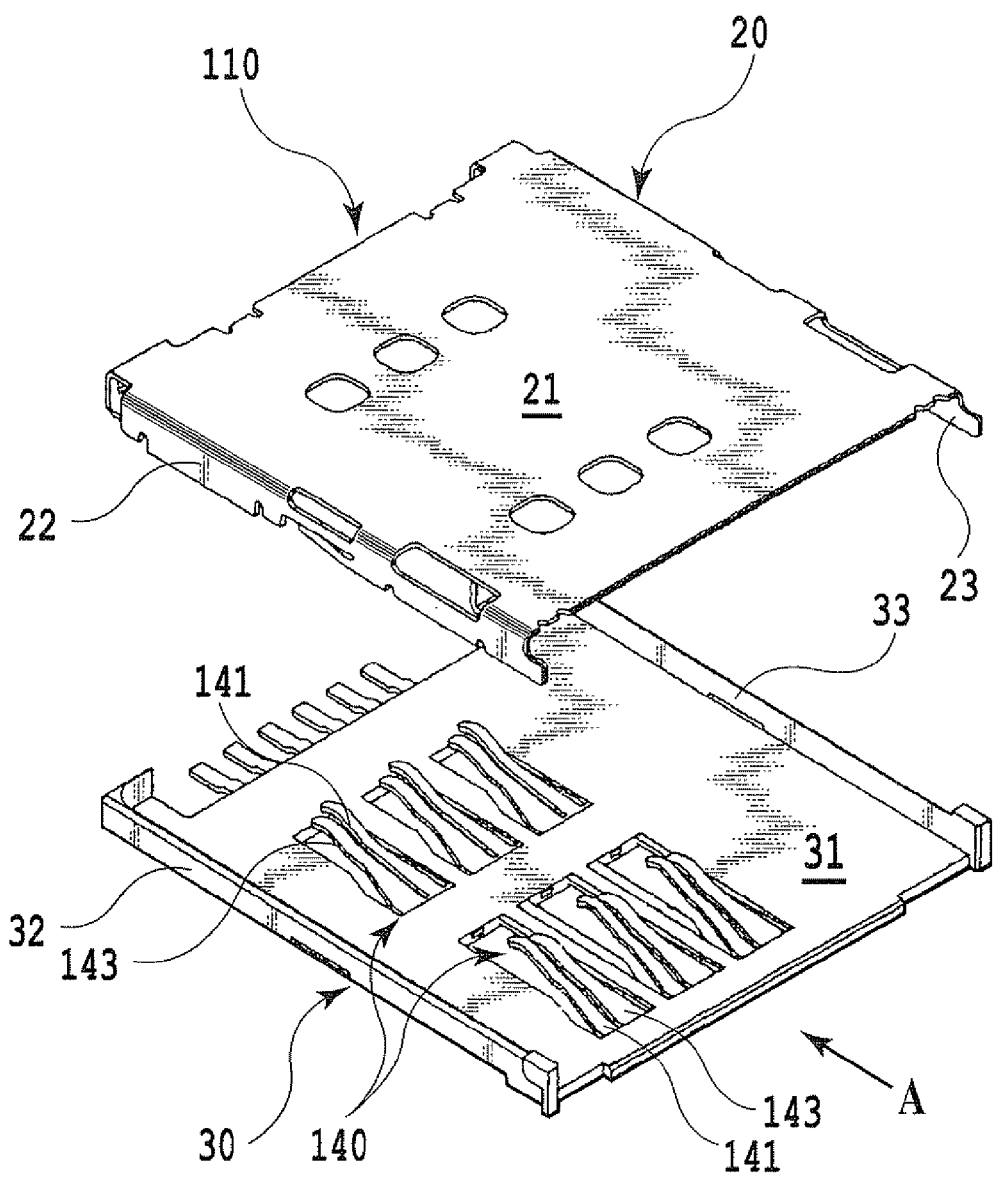
FIG. 3 is a schematic perspective view of a card connector according to another embodiment of the present invention.

Hereinafter, a card connector according the present invention will be described with reference to FIGS. 1 to 3. FIGS. 1 and 2 are a perspective view of a card connector according to an embodiment of the present invention and a plan view of the card connector from which a cover member is removed, respectively. FIG. 3 is a perspective view of a card connector according to another embodiment of the present invention.

A card connector 10 according to the present invention shown in FIG. 1 substantially includes a cover member 20, a base member 30, and a plurality of contacts 40. As described above, the card connector 10 of the present embodiment is used in a SIM card in which a plurality of pads is arranged in a matrix form in parallel with a front-back direction with respect to a card insertion direction to a card connector.

The cover member 20 includes at least a top plate 21, a left side wall 22, and a right side wall 23, and is formed from a sheet metal by a press work. The cover member 20 forms a card accommodation space in which the SIM card (not shown) is mounted when being overlapped by the base member 30 described below. The SIM card is inserted into the card accommodation space of the card connector 10 in a direction indicated by an arrow A. In other words, the card accommodation space opens in a direction (backward direction) opposite to the direction indicated by the arrow A to form a card insertion opening.

The base member 30 includes at least a bottom plate 31, a left side wall 32, a right side wall 33, and a front wall 34, and is formed from an electrically insulating synthetic resin by a molding process. As described above, the base member forms the card accommodation space, into which the card insertion opening opens toward backward, when being overlapped by the cover member 10. In the bottom plate 31, window portions 37 and 38 having a substantially rectangular shape elongated in the front-back direction in the card insertion direction A are formed in two parallel rows in the front-back direction. As shown in FIGS. 1 and 2, a plurality of the window portions 37 in a front row and a plurality of the window portions 38 in a back row are arranged in a matrix form, and a plurality of two-point contact type contacts 40 described below is respectively arranged in the window portions 37 and the window portions 38.

In the present embodiment, each of the plurality of contacts 40 is a two-point contact type contact, includes two elastic pieces 41 and 43 as a first and a second elastic piece, and a terminal portion 45, and is formed from an electrically conductive sheet metal by a press work. Free ends of the first and second elastic pieces 41 and 43 are provided with contact point portions 42 and 44 respectively that electrically contact a corresponding pad of the IC card. As described above, to prevent the instantaneous interruption, the first and second elastic pieces 41 and 43 are formed so that the natural frequencies thereof are different from each other. In the present embodiment, the lengths of the first and second elastic pieces 41 and 43 are set to be the same and the widths of the first and second elastic pieces 41 and 43 are set to be different from each other, and thereby the first and second elastic pieces 41 and 43 are formed so that the natural frequencies thereof are different from each other. Specifically, the width of the first elastic piece is widened to reduce the natural frequency and the width of the second elastic piece is reduced to increase the natural frequency. By forming the elastic pieces as described above, as a result, the spring constant of the first elastic piece 41 becomes large, and thus the contact pressure to the pad of the IC card is set to be large. On the other hand, the spring constant of the second elastic piece 43 becomes small, and thus the contact pressure is set to be small. The terminal portion 45 of the contact 40 is soldered to an external contact point of a printed circuit of an electric device to which the card connector 10 is attached.

A plurality of contacts 40 is arranged in a matrix form in a plurality of parallel rows in the front-back direction along the card insertion direction indicated by the arrow A so that the two elastic pieces 41 and 43 are positioned in the plurality of window portions 37 and 38 in the base member 30. In the present embodiment, regarding the plurality of contacts 40, as shown in FIGS. 1 and 2, a total of six contacts are arranged in parallel two rows in the front-back direction each including three contacts corresponding to the pads which are the external contact points of the IC card. A part of each contact 40 is buried in the base member 30 by insert molding when the base member 30 is molded, and each contact 40 is fixed to the base member 30 so that the two elastic pieces 41 and 43 are supported by a cantilever structure. The fixing of the contacts 40 is not limited to this. For example, a part of each contact may be fixed to the base member 30 by press fitting.

As shown in FIGS. 1 and 2, in the present embodiment, each of the three contacts 40 arranged in the front row is arranged so that the first elastic piece 41 is positioned on the left side when viewing along the card insertion direction A and the second elastic piece 43 is positioned on the right side. On the other hand, each of the three contacts 40 arranged in the back row is arranged so that the second elastic piece 43 is positioned on the left side when viewing along the card insertion direction A and the first elastic piece 41 is positioned on the right side. In other words, the present invention is characterized in that the contacts 40 are fixed to the base member 30 so that the second elastic piece 43 of the contact 40 arranged in the back row is linearly aligned with the first elastic piece 41 of the contact 40 arranged in the front row and the first elastic piece 41 of the contact 40 arranged in the back row is linearly aligned with the second elastic piece 43 of the contact 40 arranged in the front row.

In this way, by differentiating the arrangements of the two elastic pieces 41 and 43 of the contacts 40 arranged in the front and the back rows, the abrasion of the pads arranged in the front row of the inserted IC card due to contact with the contact point portions 42 and 44 of the two elastic pieces 41 and 43 is equalized. Specifically, the pad arranged in the front row of the IC card, when inserted into the card connector 10, contacts the contact 40 arranged in the back row of the card connector 10, and next contacts the contact 40 arranged in the front row. At this time, a portion of the pad of the IC card which contacts the contact point portion 42 of the first elastic piece 41 having large contact pressure in the contact 40 arranged in the back row contacts the contact point portion 44 of the second elastic piece 43 having small contact pressure in the contact in the front row. Similarly, a portion of the pad of the IC card which contacts the contact point portion 44 of the second elastic piece 43 having small contact pressure in the contact 40 arranged in the back row contacts the contact point portion 42 of the first contact piece 41 having large contact pressure in the contact arranged in the front row. In other words, unlike the conventional manner, the pad of the IC card has no portion which contacts only an elastic piece having large contact pressure and no portion which contacts only an elastic piece having small contact pressure, and thus the degree of abrasion of the pad is equalized and the abrasion is not unevenly distributed on the pad. Therefore, the life of the IC card can be longer than that of conventional ones.

Although, in the present embodiment, all of the plurality of contacts 40 arranged in the front row are arranged so that the first elastic piece 41 and the second elastic piece 43 are arranged in the same arrangement, it is not limited to this. For example, as in another embodiment shown in FIG. 3 described below, each of the three contacts 40 arranged in the front row may be arranged so that the second elastic piece 43 is positioned on the left side when viewing along the card insertion direction A and the first elastic piece 41 is positioned on the right side. In this case, each of the three contacts 40 arranged in the back row is arranged so that the first elastic piece 41 is positioned on the left side when viewing along the card insertion direction A and the second elastic piece 43 is positioned on the right side.

Alternatively, the arrangements of the first elastic piece 41 and the second elastic piece 43 in the adjacent contacts 40 may be opposite to each other. In this case, needless to say, the first elastic piece 41 and the second elastic piece 43 in a plurality of contacts 40 arranged in the back row are arranged to be opposite to the arrangement of the first elastic piece 41 and the second elastic piece 43 in a contact 40 arranged in the front row, which is linearly aligned with the contact arranged in the back row. Therefore, in this case, the contacts 40 having the same arrangement of the first elastic piece 41 and the second elastic piece 43 are arranged in a zigzag pattern.

FIG. 3 shows another embodiment of the present invention. A card connector 110 shown in FIG. 3 is the same as the embodiment shown in FIGS. 1 and 2 except for two elastic pieces 141 and 143 of a contact 140. Therefore, in FIG. 3, the same members as those in the embodiment shown in FIGS. 1 and 2 are given the same reference numerals and the description of the card connector 110, except for those of the contact 140, will be omitted.

In the present embodiment, in order to prevent the instantaneous interruption, the lengths of the first elastic piece 141 and the second elastic piece 143 of the contact 140 are differentiated so as to differentiate the natural frequencies thereof. Specifically, the first elastic piece 141 is formed to have a long length and a small width, and the second elastic piece 143 is formed to have a short length and a wide width.

Regarding the arrangement of the contacts according to the present embodiment, each of the three contacts 140 arranged in the front row is arranged so that the second elastic piece 143 is positioned on the left side when viewing along the card insertion direction A and the first elastic piece 141 is positioned on the right side. On the other hand, each of the three contacts 140 arranged in the back row is arranged so that the first elastic piece 141 is positioned on the left side when viewing along the card insertion direction A and the second elastic piece 143 is positioned on the right side. A plurality of contacts 140 is arranged in this way, and thereby the same operation and effect as those in the embodiment shown in FIGS. 1 and 2 can be expected.

Also, by differentiating the lengths of the first and second elastic pieces of the contacts of the card connector and equalizing the widths of the first and second elastic pieces, the same operation and effect as those in the embodiment shown in FIGS. 1 to 3 can be expected.

Reference Signs List
10, 110 card connector
20 cover member
30 base member
40, 140 contact
41, 141 first elastic piece
43, 143 second elastic piece

The invention claimed is:

1. A card connector into which an IC card is inserted into, the IC card having a plurality of external contact points arranged in parallel at a first row position and a second row position, said card connector comprising:
at least two contacts of a plurality of contacts configured to contact two corresponding external contact points of said plurality of external contact points of said IC card;
a base member configured to support the at least two contacts of the plurality of contacts; and
a cover member configured to form a card accommodation space into which said IC card is inserted when the cover member is overlapped on said base member; wherein
said IC card is inserted into said card accommodation space through a card insertion opening in which said card accommodation space opens,
the at least two contacts of said plurality of contacts including a first and a second elastic piece, the first and second elastic pieces each having a contact point portion that electrically contacts an external contact point of said IC card,
the first and second elastic pieces being configured such that a contact pressure of the first elastic piece against a corresponding external contact point is different from a contact pressure of the second elastic piece against another corresponding external contact point, and
said plurality of contacts being arranged on the base member in parallel at a first row position and a second row position in an IC card insertion direction, the first elastic piece in the first row position being linearly aligned with the second elastic piece in the second row position, and the second elastic piece in the first row position being linearly aligned with the first elastic piece in the second row position.

2. The card connector according to claim 1, wherein said first and second elastic pieces of said contact are formed to have the same length and different widths.

3. The card connector according to claim 1, wherein said first and second elastic pieces of said contact are formed to have different lengths and the same width.

4. The card connector according to claim 1, wherein said first and second elastic pieces of said contact are formed to have different lengths and different widths.

5. The card connector according to claim 1, wherein a contact pressure of the first elastic piece is greater than a contact pressure of the second elastic piece.

* * * * *